US009044713B2

(12) United States Patent
Ratto et al.

(10) Patent No.: US 9,044,713 B2
(45) Date of Patent: *Jun. 2, 2015

(54) ASYMMETRIC NANOTUBE CONTAINING MEMBRANES

(71) Applicant: Nagare Membranes, LLC, Coventry, CT (US)

(72) Inventors: Timothy V. Ratto, Oakland, CA (US); Jason K. Holt, Berkeley, CA (US); Alan W. Szmodis, Oakland, CA (US)

(73) Assignee: NAGARE MEMBRANES LLC, Coventry, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,485

(22) Filed: Dec. 4, 2013

(65) Prior Publication Data
US 2014/0091032 A1    Apr. 3, 2014

Related U.S. Application Data

(60) Continuation of application No. 13/918,570, filed on Jun. 14, 2013, now Pat. No. 8,617,394, which is a continuation of application No. 13/458,376, filed on Apr. 27, 2012, now Pat. No. 8,475,661, which is a continuation of application No. 13/205,114, filed on Aug. 8, 2011, now Pat. No. 8,177,979, which is a division of application No. 12/753,353, filed on Apr. 2, 2010, now Pat. No. 8,196,756.

(51) Int. Cl.
B01D 39/00    (2006.01)
B01D 39/14    (2006.01)
B01D 63/00    (2006.01)
B01D 61/02    (2006.01)
B01D 71/06    (2006.01)
B01D 71/68    (2006.01)
B05D 3/00     (2006.01)
B01D 69/04    (2006.01)
B01D 61/14    (2006.01)
B01D 67/00    (2006.01)
B01D 71/16    (2006.01)
B82Y 99/00    (2011.01)

(52) U.S. Cl.
CPC .............. B01D 61/027 (2013.01); B01D 71/06 (2013.01); B01D 71/68 (2013.01); B05D 3/00 (2013.01); Y10S 977/751 (2013.01); B01D 69/043 (2013.01); B82Y 99/00 (2013.01); B01D 61/025 (2013.01); B01D 61/145 (2013.01); B01D 67/0013 (2013.01); B01D 71/16 (2013.01)

(58) Field of Classification Search
CPC .. B82Y 30/00; B01D 69/148; B01D 67/0079; B01D 61/027; B01D 69/141; B01D 69/02; B01D 71/68; B01D 53/228; B01D 71/06
USPC .......... 210/650–655, 500.37, 500.27, 500.41, 210/490, 502.1; 264/41; 977/751, 778; 428/304.4; 423/447.23; 427/291
See application file for complete search history.

(56) References Cited

U.S. PATENT DOCUMENTS

| 4,277,344 | A |   | 7/1981  | Cadotte |
|-----------|---|---|---------|---------|
| 4,629,563 | A |   | 12/1986 | Wrasidlo |
| 4,824,568 | A |   | 4/1989  | Allegrezza, Jr. et al. |
| 5,273,657 | A | * | 12/1993 | Nakashima et al. .......... 210/640 |
| 5,824,689 | A | * | 10/1998 | Lee et al. ...................... 514/312 |
| 6,162,358 | A | * | 12/2000 | Li et al. .................... 210/500.38 |
| 6,183,640 | B1| * | 2/2001  | Wang ...................... 210/500.41 |
| 6,426,134 | B1| * | 7/2002  | Lavin et al. ................. 428/300.1 |
| 6,858,197 | B1| * | 2/2005  | Delzeit ...................... 423/447.3 |
| 6,863,942 | B2| * | 3/2005  | Ren et al. ...................... 428/36.9 |
| 7,148,269 | B2| * | 12/2006 | Winey et al. ................... 523/218 |
| 7,205,069 | B2| * | 4/2007  | Smalley et al. ............... 429/129 |
| 7,211,320 | B1| * | 5/2007  | Cooper et al. ............. 428/306.6 |
| 7,459,121 | B2| * | 12/2008 | Liang et al. ................... 264/555 |
| 7,544,626 | B2| * | 6/2009  | Tang et al. .................... 438/800 |
| 7,585,412 | B2| * | 9/2009  | Gorsuch et al. .......... 210/500.23 |
| 7,611,628 | B1| * | 11/2009 | Hinds, III ............... 210/500.27 |
| 7,623,340 | B1| * | 11/2009 | Song et al. ..................... 361/502 |
| 7,891,500 | B2|   | 2/2011  | Kools |
| 7,993,524 | B2| * | 8/2011  | Ratto et al. ..................... 210/652 |
| 8,029,857 | B2|   | 10/2011 | Hoek et al. |
| 8,038,887 | B2| * | 10/2011 | Bakajin et al. ................ 210/652 |
| 8,177,979 | B2| * | 5/2012  | Ratto et al. ..................... 210/652 |
| 8,196,755 | B2|   | 6/2012  | Diefenbacher et al. |
| 8,196,756 | B2| * | 6/2012  | Ratto et al. ................ 210/500.41 |
| 8,475,661 | B2| * | 7/2013  | Ratto et al. ..................... 210/652 |
| 8,617,394 | B2| * | 12/2013 | Ratto et al. ................. 210/323.1 |
| 2003/0180526 | A1| * | 9/2003 | Winey et al. ................... 428/323 |

(Continued)

FOREIGN PATENT DOCUMENTS

WO    WO 2006/098872 A2    9/2006
WO    WO 2007/025104 A2    3/2007
WO    WO 2008/048227 A2    4/2008

OTHER PUBLICATIONS

Ajayan, P.M., et al., "Nanometre-Size Tubes of Carbon", Rep. Prog. Phys., 60, (1997) 1025-1062.
Bronikowski, M.T., et al., "Gas-phase production of carbon single-walled nanotubes from carbon monoxide via the HiPCO process: a parametric study", J. Vac. Sci. Technol., 19, 1800-1805 (2001).
Dresselhaus, et al., "Science of Fullerenes and Carbon Nanotubes", Academic Press, San Diego (1996)-Table of contents.
Holt, et al.,"Fast Mass Transport Through Sub-2-Nanometer Carbon Nanotubes" , Science 312, 1034 (2006).
Lanx Fabric Systems™, Chemical and Biological Protective Apparel, www.lanxfabrics/lanxUndergarments.htm, Feb. 20, 2012, 1pg.
Nikolaev, P. et al., "Gas Phase catalytic growth of single-walled carbon nanotubes from carbon monoxide", Chem Phys Lett, 313, 91-97 (1999).

(Continued)

Primary Examiner — Ana Fortuna
(74) Attorney, Agent, or Firm — The Marbury Law Group PLLC

(57) ABSTRACT

This invention relates to heterogenous pore polymer nanotube membranes useful in filtration, such as reverse osmosis desalination, nanofiltration, ultrafiltration and gas separation.

19 Claims, No Drawings

(56) References Cited

U.S. PATENT DOCUMENTS

| | | |
|---|---|---|
| 2004/0173506 A1* | 9/2004 | Doktycz et al. .................. 210/85 |
| 2005/0183405 A1* | 8/2005 | Gillingham et al. ............. 55/486 |
| 2008/0223795 A1* | 9/2008 | Bakajin et al. ................. 210/767 |
| 2008/0290020 A1 | 11/2008 | Marand et al. |
| 2009/0118420 A1 | 5/2009 | Zou et al. |
| 2009/0321355 A1* | 12/2009 | Ratto et al. .................... 210/651 |
| 2012/0080380 A1 | 4/2012 | Wang et al. |
| 2012/0285890 A1 | 11/2012 | Koehler et al. |
| 2013/0146530 A1 | 6/2013 | Wang et al. |

OTHER PUBLICATIONS

Peigney, et al., "Carbon nanotubes in Novel Ceramic Matrix Nanocomposite", Ceram. Inter., 26, (2000) 677-683.

Thess, A. et al., "Crystalline Ropes of Metallic Carbon Nanotubes", Science, 273 (1996) 483-487.

Witanachchi, S., "Role of Temporal Delay in Dual-Laser Ablated Plumes", J. Vac. Sci. Technol. A, 13 (3), (1995); pp. 1171-1174.

* cited by examiner

ASYMMETRIC NANOTUBE CONTAINING MEMBRANES

BACKGROUND OF THE INVENTION

1. Field of the Invention

This invention relates to heterogenous pore polymer nanotube membranes useful in filtration, such as reverse osmosis desalination, nanofiltration, ultrafiltration and gas separation.

2. Description of the Prior Art

Polymer membranes with pores in the polymer surface are often used in reverse osmosis purification of fluids, such as water. These membranes permit transport of water through a solution-diffusion mechanism. A disadvantage is that water must dissolve into the polymer material comprising the membrane and diffuse through. The result is a very low water flux compared to membrane materials that contain open channels through the membrane.

To increase flux in conventional membrane materials, the constituent polymer structure can be made looser by judicious choice of polymerization parameters. However, the rejection performance of the membrane is reduced as a result. In some cases, materials have been added to the polymer to adjust permeability properties. For example, U.S. Pat. No 4,277,344 (J. E. Cadotte, FilmTec Corporation) describes interfacial synthesis of a reverse osmosis membrane with embedded particles. US patent application no. 2006/007037 The Regents of the University of California) is a variant of the Cadotte patent, describing methods of membrane fabrication. These membranes remain unsatisfactory since increasing permeability will often reduce selectivity of filtration.

A different type of membrane involves directing water flux through carbon nanotubes attached to a silicon chip. US patent publication no. 2006/033180 (The Regents of the University of California) describes a method of fabricating a material using micromachining or micro electromechanical systems techniques. Holt et al, (Science 312, 1034 (2000) describes water transport through sub-2 nm inner diameter carbon nanotube pores as being higher than predictions of continuum hydrodynamics models. The method described is a micro-electro-mechanical systems compatible fabrication process for fabrication of carbon nanotube pore membranes using catalytic chemical vapor deposition growth of a dense, vertically-aligned array of double walled carbon nanotubes on the surface of a silicon chip. Gaps between the nanotubes are then filled in a separation step by a process such as vapor deposition. However, this method presents problems with respect to scalability, due to the use of the chemical vapor deposition, and cost, due to the use of silicon as a substrate material.

There remains a need for a sealable filtration membrane that provides adequate flux and selectivity for commercial use in desalination, nanofiltration, and ultrafiltration.

SUMMARY OF THE INVENTION

One aspect of the invention is a membrane selective permeability, which membrane comprises a porous polymer and terminating on one side in a skin, with nanotubes embedded in said membrane and protruding through said skin and said skin forming a substantially impermeable barrier around said nanotubes, said membrane having pores increasing in diameter with increasing distance from said skin.

A second aspect of the invention is a membrane of selective permeability, which membrane comprises a porous polymer mid terminating on one side in a skin and terminating on the opposite side from said skin in a porous non-woven substrate, with nanotubes embedded in said membrane and protruding through said skin and said skin forming a substantially impermeable barrier around said nanotubes, said membrane having pores increasing in diameter with increasing distance from said skin.

A third aspect of the invention is a process for the fabrication of a membrane of selective permeability, said process comprises: (a) coating a substrate with a film of polymer solution comprising a polymer dissolved in a solvent; (b) forming over said film of polymer solution a nanotube dispersion layer comprising nanotubes dispersed in a liquid carrier that is partially miscible with, but forms a separate liquid phase from, said polymer solution; (c) evaporating said liquid carrier from said nanotube dispersion layer to leave a residual nanotube dispersion layer over said substrate, said residual nanotube dispersion layer comprising said nanotubes dispersed in said polymer solution and protruding from said nanotube dispersion layer; (d) contacting said residual nanotube dispersion layer with a liquid that is at least partially miscible with said solvent but in which said polymer is substantially insoluble, to cause precipitation of said polymer to form a porous membrane terminating on one side in a skin, with barrier around said nanotubes, said membrane having pores increasing in diameter with increasing distance from said skin; and (e) optionally separating said porous membrane from said substrate.

DETAILED DESCRIPTION OF THE INVENTION

Definitions

Unless otherwise stated, the following terms used in the specification and claims are defined for the purposes of this Application and have the following meanings.

"Nanotubes" are cylindrical tubular structures that are of micrometer scale. Nanotubes of a variety of materials have been studied, notably carbon nanotubes, boron nanotubes, and nanotubes of boron nitride. Those that have been most extensively studied are carbon nanotubes, whose features and methods of fabrication are illustrative of nanotubes in general.

"Carbon nanotubes" are polymers of pure carbon, and exist as single-wall and multi-wall structures. Examples of publications describing carbon nanotubes and their methods of fabrication are Dresselhaus, M. S., et al., *Science of Fullerenes and Carbon Nanotubes*, Academic Press, San Diego (1996). Ajayan, P. M., et al., "Nanometer-Size Tubes of Carbon," *Rep. Prog. Phys.* 60 (1997): 1025-1062, and Peigney, A., et at, "Carbon nanotubes in novel ceramic matrix nanocomposites," *Ceram. Inter.* 26 (2000) 677-683. A single-wall carbon nanotube is a single graphene sheet rolled into a seamless cylinder with either open or closed ends. When closed, the ends are capped either by half fullerenes or by more complex structures such as pentagonal lattices. The average diameter of a single-wall carbon nanotube typically ranges of 0.6 nm to 100 nm; and in many cases 1.5 nm to 10 mm. The aspect ratio, i.e., length to diameter, typically runs from about 25 to about 1,000,000, and most often from about 100 to about 1,000. A nanotube of 1 nm diameter may thus have a length of from about 100 to about 1,000 nm. Nanotubes frequently exist as "ropes," which are bundles of 3 to 500 single-wall nanotubes held together along their lengths by van der Waals forces. Individual nanotubes often branch off from a rope to join nanotubes of other ropes. Multi-walled carbon nanotubes are two or more concentric cylinders of graphene sheets of successively larger diameter, forming a layered composite tube bonded together by van der Waals forces, with a distance of approximately 0.34 nm between layers.

Carbon nanotubes can be prepared by arc discharge between carbon electrodes in an inert gas atmosphere. This process results in a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et at "Crystalline Ropes of Metallic Carbon Nanotubes," *Science* 273 (1996): 483-487, and by Witanachi, S., et al., "Role of Temporal Delay in Dual-Laser Ablated Plumes," *J. Vac. Sci. Technol. A* 3 (1995): 1171-1174. A further method of producing single-wall nanotubes is the high-pressure carbon monoxide conversion ("HiPCO") process disclosed by Nikolaev, P., et al., "Gas-phase catalytic growth of single-walled carbon nanotubes from carbon monoxide," *Chem. Phys. Lett.* 313, 91-97 (1999), and by Bronikowski, M. J., et al., "Gas-phase production of carbon single-walled nanotubes hum carbon monoxide via the HiPCO process: A parametric study," *J. Vac. Sci. Technol.* 19, 1800-1805 (2001).

Certain procedures for the synthesis of nanotubes will produce nanotubes with open ends while others will produce closed-end nanotubes. If the nanotubes are synthesized in closed-end form, the closed ends can be opened by a variety of methods known in the art. An example of a nanotube synthesis procedure that produces open-ended nanotubes is that described by Hua, D. H. (Kansas State University Research Foundation), International Patent Application Publication No. WO 2008/048227 A2, publication date Apr. 24, 2008. Closed ends can be opened by mechanical means such as cutting, by chemical means or by thermal means. An example of a cutting method is milling. Chemical means include the use of carbon nanotube degrading agents, an example of which is a mixture of a nitric acid and sulfuric acid in aqueous solution at concentrations of up to 70% and 96%, respectively Another chemical means is reactive ion etching. Thermal means include exposure to elevated temperature in an oxidizing atmosphere. The oxidizing atmosphere can be achieved by an oxygen concentration ranging from 20% to 100% by volume, and the temperature can range from 200° C. to 450° C.

The lengths of the nanotubes can vary widely and are not critical to the invention. The lengths are expressed herein as average lengths, using numerical or arithmetic averages. In preferred embodiments, the average length is from about 100 nm to about 2000 nm, most preferably from about 200 nm to about 1000 nm, whether single-wall, multi-wall, or a combination of single-wall and multi-wall. The outer and inner diameters of the nanotubes can likewise vary. In the most common embodiments, the outer diameters can range from about 0.6 nm to about 200 nm, while narrower ranges are often preferred for particular applications. The inner diameters in the most common embodiments can likewise range from about 0.4 nm to about 200 nm, although the optimal diameters for particular applications may be within narrower ranges. For reverse osmosis, and notably for water desalination, a preferred inner diameter range is about 0.4 nm to about 5 nm, and a most preferred range is front about 0.4 nm to about 1.2 nm. For nanofiltration membranes, a preferred size range is from about 1 nm to about 10 nm. For ultrafiltration membranes, a preferred size range is from about 5 nm to about 200 nm.

"Polymers" useful in preparing the asymmetric membranes of the invention include, but are not limited to, aromatic polyamides, aliphatic polyamides, cellulose acetates, cellulose nitrate, cellulosic derivatives, ethyl cellulose, polyesters, polycarbonates, copolycarbonate esters, polyethers, polyetherketones, polyetherimides, polyethersulfones polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, styrene-acrylonitrile copolymers, brominated poly(xylene oxide), sulfonated poly (xylylene oxide), polyquinoxaline, polyamide imides, polyamide esters, polysiloxanes, polyacetylenes such as poly(trimethylsilylpropyne), polyphosphazenes, polyolefines such as polyethylene, polypropylene and poly(4-methylpentene), polyphenylenes, polyimides, polyesters and so called ladder polymers, polyacrlonitrile, polyphthalamides, polysulfonamides, polyamide-imides, phenylene diamines such as ortho-phenylenediamine and meta-phenylenediamine, Matrimid®, Lenzing P84, polyamide hydrazide, Nylon 6, poly(ethylene-co-vinyl alcohol), polytetrafluoroethylene, and the like and any blends, copolymers, and substituted polymers thereof. Polymers preferred for preparing the asymmetric membranes of the invention are polysulfones, e.g., poly(1,4-phenylene ether-ether-sulfone), poly(1-hexadecene-sulfone), poly(1-tetradecene-sulfone), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), poly[1-[4-(3-carboxy-4-hydroxyphenylazo)benzenesulfonamido]-1,2-ethanediyl, polyphenylsulfone and polysulfone.

"Selective permeability" as used herein means molecules of a specified size can freely pass through the membrane while most, in not all molecules of larger sizes cannot pass through the membrane.

"Liquid carrier" is a liquid composition that is at least partially miscible with the solvent containing the polymer comprising the membrane and wherein most of the nanotubes are dispersed in solution such that when the solution of nanotubes is formed over the surface of the film of the polymer solution the nanotubes become evenly embedded into the underlying polymer solution. Suitable compositions may contain a nanotube dispersing agent.

"Substantially impermeable barrier" as used herein means a barrier that, except for the nanotubes embedded in the barrier, is either completely impervious or partially impervious to the extent that the barrier is pervious to molecules that are smaller than or about equal to in size of those molecules that can freely pass through the embedded nanotubes.

"Substrate" as used herein for the casting surface on which the film of polymer solution is coated can be comprised of any non-reactive material that the liquid polymer solution will adhere to during the casting and immersion steps. Suitable substrates may be non-porous in which case the material must be such that the membrane formed by the process can easily be separated, e.g., glass, and the like. Suitable substrates can be porous in which case the substrate would not generally separated from the membrane formed by the process and would be an integral component of the membrane. A suitable porous substrate includes non-woven fabric, Preferred Embodiments While the broadest definition of the invention is set forth in the Summary of the Invention, certain aspects of the invention are preferred. For example, a preferred embodiment is a membrane of invention wherein the polymer used for making the heterogenous pore polymer structure is selected from the group consisting of poly(1,4-phenylene ether-ether-sulfone), poly(1-hexadecene-sulfone), poly(1-tetradecene-sulfone), poly(oxy-1,4-phenylenesulfonyl-1,4-phenylene), poly(oxy-1,4-phenylenesulfonyl-1,4-phenylene), poly(oxy-phenylenesulfonyl-1,4-phenylene), poly(oxy-1,4-phenylenesulfonyl-phenylene), poly[1-[4-(3-carboxy-4-hydroxyphenylazo) benzenesulfonamido]-1,2-ethanediyl, polyphenylsulfone and polysulfone. Preferably the polymer is polysulfone.

Preferred membranes are those in which the nanotubes are carbon nanotubes. Preferred membranes are those wherein the embedded nanotubes are single-walled nanotubes. Preferred membranes are those wherein the average length of the nanotubes is from about 300 nm to about 2000 nm, more preferably from about 500 nm to about 1000 nm. Preferred membranes are those wherein the nanotubes have inner diameters from about 0.4 nm to about 20 nm, more preferably from about 0.8 nm to about 10 nm, more preferably from about 0.8 nm to about 1.4 nm and most preferably from about 0.8 nm to about 0.9 nm.

A preferred process for making the asymmetric membranes of the invention is wherein the dispersion solvent contains a nanotube dispersing agent. Preferably the dispersing agent is polystyrene-poly-3-hexylpolythiophene copolymer. Preferably the polymer used in the process to make the heterogenous porous polymer structure is a polysulfone-like polymer selected from the group consisting of poly(1,4-phenylene ether-ether-sulfone), poly(1-hexadecene-sulfone), poly(1-tetradecene-sulfone), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), poly[1-[4-(3-carboxy-4-hydroxyphenylazo)-benzenesulfonamido]-1,2-ethanediyl, polyphenylsulfone and polysulfone. Preferably polysulfone is the polymer used in the process.

Preparation of Membranes

The membranes of the invention are asymmetric membranes and the steps comprising the process for preparing the membranes of the invention, in general, can be performed by methods known in the art. The membranes are made by phase inversion using immersion precipitation techniques, whereby a east polymer in liquid state is transformed into a solid state by immersion in a non-solvent. The immersion precipitation produces a membrane having a thin surface layer overlaying a porous sublayer. A variety of process variables will impact the physical characteristics of the membrane as a whole. Polymer type, polymer concentration, polymer solvent, nanotube solvent, precipitation liquid, dry times and temperatures differentially affect the process.

Accordingly, membranes of the invention are prepared by (a) coating a substrate with a film of polymer solution comprising a polymer dissolved in a solvent; (b) forming over said film of polymer solution a nanotube dispersion layer comprising nanotubes dispersed in a liquid carrier that is partially miscible with, but forms a separate liquid phase from said polymer solution; (c) evaporating said liquid carrier from said nanotube dispersion layer to leave a residual nanotube dispersion layer over said substrate, said residual nanotube dispersion layer comprising said nanotubes dispersed in said polymer solution and protruding from said nanotube dispersion layer; (d) contacting said residual nanotube dispersion layer with a liquid that is at least partially miscible with said solvent but in which said polymer is substantially insoluble, to cause precipitation of said polymer to form a porous membrane terminating on one side in a skin, with barrier around said nanotubes, said membrane having pores increasing in diameter with increasing distance from said skin and (e) optionally separating said porous membrane from said substrate.

Coating of the liquid polymer solution is carried out by spreading a thin layer of the polymer solution onto a substrate. The coating is carried out at −10 to 90° C., preferably at about ambient temperature. The polymer solvent type will be dictated by the polymer type and the precipitation liquid. Suitable solvents, in general, include polar aprotic solvents, e.g., N,N-dimethylacetamide, N,N-dimethylformamide, dimethyl sulfoxide, N-methyl-2-pyrrolidinone, and the like. Polymer concentrations will vary with the polymer type. Typically the polymer concentration will be from about 10 to about 30% by weight and preferably about 20% by weight. The polymer is spread onto the substrate to a thickness of 0.001 to 1 mm and preferably to about 0.25 mm. The polymer layer is allowed to set on the substrate about 2 seconds before the nanotube solution is applied.

Deposition of the nanotube solution is carried out by spreading a thin layer of the solution onto the surface of the liquid polymer layer. The deposition is carried out at 10° C. to 70° C., preferably at about ambient temperature. Suitable solvents, in general, include solvents, e.g., chloroform, toluene, benzene, halobenzenes, alkyl benzenes, tetrahydrofurna, and the like. Preferably the dispersion solvent is at least partially miscible with the solvent containing the polymer comprising the membrane and wherein most of the nanotubes are dispersed in solution as isolated nanotubes. Preferred dispersion solvents contain a nanotube dispersing agent. A preferred dispersing agent is polystyrene-poly-3-hexylpolythiophene copolymer.

Evaporation of the solubilizing solvent can be carried out by forcing a convective airflow over the liquid polymer layer or allowing the solvent to evaporate freely into the air. The evaporation can be effected at ambient temperature to 50° C. and requires 5 seconds to 15 minutes to complete. A preferred method for drying the multilayer polymer deposit is in an oven at 70° C. for about 10 minutes The precipitation step is carried out at ambient temperature to −10° C., and requires 5 minutes to 15 minutes to complete. Suitable precipitation liquids are those that are a non-solvent for the polymer. Suitable non-solvents are polar solvents, e.g., water, alcohols, glycols, and the like or suitable mixtures thereof. The precipitation step is carried out in a manlier that a thin skin layer at the surface of the heterogeneous pore structure forming a substantially impermeable barrier around the nanotubes. The thin skin layer will be thick enough to be substantially impermeable and thin enough such that some or all of the nanotubes will have each of their open ends protruding from opposite sides of and providing selective egress through the barrier. Preferably, the thin skin surface layer has a minimum thickness of one-third, and more preferably one-fifth, of the average nanotube length.

Separation of the heterogeneous pore structure from the substrate can be carried out by any means that separates the membrane from the substrate while maintaining an intact membrane. Typically the membrane is gently peeled away from the substrate.

EXAMPLES

The following examples are offered for purposes of illustration and are not intended to limit the scope of the invention.

Example 1

Preparation of Asymmetric Cellulose Acetate/Nanotube Membrane

A solution of 18% by weight cellulose diacetate (acetylation 39.8%) in a 2.5:1 volume ratio of acetone to formamide was spread with a casting knife onto a surface of a glass plate to a thickness of about 0.25 mm. The liquid cellulose acetate layer was allowed to set on the glass surface for 2 seconds and then a 0.1% by weight solution of multi-walled, open-ended nanotubes dispersed using 0.1% by weight polystyrene-poly 3 hexylthiophene in chloroform was spread with a casting knife onto the liquid cellulose acetate layer to a thickness of about 0.01 mm. The multilayer wet film was exposed to dry air for 15 seconds to allow the chloroform to evaporate and the carbon nanotubes to become embedded in the incipient skin layer of the membrane. The wet film was then immersed in water to drive the formation of the asymmetric membrane. The coagulated membrane separated from the glass surface and was removed to yield a cellulose acetate/nanotube membrane measuring from 0.06 to 0.10 mm in thickness. Scanning electron microscopy revealed that the membrane had an asymmetric pore structure with an approximately 200 nm skin layer having no discernible pores supported by a heterogeneous sponge-like layer underneath. The carbon nanotubes were concentrated in the topmost layer wherein some of the nanotubes embedded within the skin had one open end protruding above the skin layer and the other open end traversing through the thin skin outer layer into the porous region beneath the thin skin outer layer.

Example 2

Preparation of Asymmetric Polysulfone/Nanotube Membrane

A solution of 15% by weight polysulfone (Udel-3500) in N-Methyl-2-pyrrolidone was spread with a casting knife onto a surface of a glass plate to a thickness of about 0.25 mm. The liquid polysulfone layer was allowed to set on the glass surface for 2 seconds and then a 0.1% by weight solution of multi-walled, open-ended nanotubes dispersed using 0.1% by weight polystyrene-poly 3 hexylthiophene in toluene was spread with a casting knife onto the liquid cellulose acetate layer to a thickness of about 0.01 mm. The multilayer wet film was annealed in an oven at 70° C. for 10 minutes to allow the toluene to evaporate and the carbon nanotubes to become embedded in the incipient skin layer of the membrane. The wet film was then immersed in 10° C. water to drive the formation of the asymmetric membrane. The coagulated membrane separated from the glass surface and was removed to yield a polysulfone/nanotube membrane measuring from 0.06 to 0.10 mm in thickness. Scanning electron microscopy revealed that the membrane had an asymmetric pore structure with an approximately 250 nm skin layer supported by a heterogeneous sponge-like layer underneath. The carbon nanotubes were concentrated in the topmost layer wherein some of the nanotubes embedded within the skin had one open end protruding above the skin layer and the other open end traversing through the thin skin outer layer into the porous region beneath the thin skin outer layer. Permeabilities of the polysulfone/carbon nanotube membranes were 3.8 times higher than the permeabilities of the non-carbon nanotube polysulfone controls while rejection of a 3.5 nm marker was reduced, indicating that some liquid transport was occurring through the carbon nanotubes while some liquid transport was still occurring through pores in the polymer membrane.

TABLE 1

Comparison of Polysulfone/Carbon Nanotube Performance vs. Polysulfone controls

| Membrane Type | Permeability ($m^3/m^2$-s-Pa) | Rejection (% Peg4000) |
| --- | --- | --- |
| Polysulfone/CNT Membrane | $373 \pm 96 \times 10^{-12}$ | 39 |
| Polysulfone control | $96 \pm 22 \times 10^{-12}$ | 80 |

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art—understood definition of a word or phrase and a definition explicitly provided in this specification of the same word or phrase.

What is claimed is:

1. A filter, comprising:
   a porous polymer terminating on one side in a polymer skin, wherein the porous polymer and the polymer skin comprise the same polymer; and
   open-ended nanotubes embedded in the polymer skin, at least a portion of the nanotubes each having two open ends protruding through opposite surfaces respectively of the polymer skin to provide fluid communication through each of the nanotubes; and
   wherein the porous polymer has pores increasing in diameter with increasing distance from the polymer skin; and
   wherein the polymer skin is completely impervious to fluid.

2. The filter of claim 1, wherein the polymer is selected from the group consisting of poly(1,4-phenylene ether-ether-sulfone), poly(1-hexadecene-sulfone), poly(1-tetradecene-sulfone), poly(oxy-1,4-phenylenesulfonyl-1,4-phenylene), poly(oxy-1,4-phenylenesulfonyl-1,4-phenylene, poly[1-[4-(3-carboxy-4-hydroxyphenylazo)benzenesulfonamido]-1,2-ethanediyl, polyphenylsulfone and polysulfone.

3. The filter of claim 1, wherein the nanotubes are single walled carbon nanotubes.

4. The filter of claim 1, wherein the polymer skin has a minimum thickness of one-fifth of the average nanotube length.

5. The filter of claim 4, wherein the average length of the nanotubes is from 300 nm to 2000 nm.

6. The filter of claim 1, wherein the nanotubes have inner diameters from 0.4 nm to 20 nm.

7. The filter of claim 1, wherein the filter comprises a reverse osmosis desalination filter, a nanofiltration filter or an ultrafiltration filter.

8. The filter of claim 1, wherein the nanotubes have a substantially random orientation relative to the polymer skin.

9. The filter of claim 1, wherein the nanotubes protrude into the porous polymer through one surface of the polymer skin.

10. A filter, comprising:
    an asymmetric porous polymer terminating on one side in a skin; and open-ended nanotubes embedded in the skin and protruding through opposite surfaces of the skin to provide fluid communication through each of the nanotubes;

wherein the polymer has pores increasing in diameter with increasing distance from the skin; and wherein the polymer skin is pervious only to molecules that are smaller than or about equal to in size of those molecules that can freely pass through the open-ended nanotubes embedded in the polymer skin.

11. The filter of claim 10, wherein the polymer is selected from the group consisting of poly(1,4-phenylene ether-ether-sulfone), poly(1-hexadecene-sulfone), poly(1-tetradecene-sulfone), poly(oxy-1,4-phenylenesulfonyl-1,4-phenylene), poly(oxy-1,4-phenylenesulfonyl-1,4-phenylene, poly[1-[4-(3-carboxy-4-hydroxyphenylazo)benzenesulfonamido]-1,2-ethanediyl, polyphenylsulfone and polysulfone.

12. The filter of claim 10, wherein the porous polymer and the skin comprise the same polymer.

13. The filter of claim 10, wherein the nanotubes are single walled carbon nanotubes.

14. The filter of claim 10, wherein the skin has a minimum thickness of one-fifth of the average nanotube length.

15. The filter of claim 14, wherein the average length of the nanotubes is from 300 nm to 2000 nm.

16. The filter of claim 10, wherein the nanotubes have inner diameters from 0.4 nm to 20 nm.

17. The filter of claim 10, wherein the filter comprises a reverse osmosis desalination filter, a nanofiltration filter or an ultrafiltration filter.

18. The filter of claim 10, wherein the nanotubes have a substantially random orientation relative to the skin.

19. The filter of claim 10, wherein the nanotubes protrude into the porous polymer through one surface of the skin.

* * * * *